United States Patent [19]

Schmale et al.

[11] Patent Number: 5,462,339
[45] Date of Patent: Oct. 31, 1995

[54] SITTING SECTION OF A VEHICLE SEAT

[75] Inventors: Gerhard Schmale, Huckeswagen; Norbert Sommer, Wermelskirchen; Martin Zynda, Remscheid, all of Germany

[73] Assignee: Naue/Johnson Controls Engineering Verwaltungs GmbH, Germany

[21] Appl. No.: 196,129

[22] PCT Filed: Aug. 12, 1992

[86] PCT No.: PCT/EP92/01839

§ 371 Date: Feb. 22, 1994

§ 102(e) Date: Feb. 22, 1994

[87] PCT Pub. No.: WO93/04892

PCT Pub. Date: Mar. 18, 1993

[30] Foreign Application Priority Data

Aug. 30, 1991 [DE] Germany .......................... 41 28 954.4

[51] Int. Cl.[6] ............................ A47C 7/02; A47C 7/18
[52] U.S. Cl. ........................... 297/452.55; 297/452.21; 297/452.54; 297/452.15; 297/452.18
[58] Field of Search ......................... 297/452.55, 452.21, 297/452.49, 452.54, 452.18, 452.15, 452.14

[56] References Cited

U.S. PATENT DOCUMENTS

| | | | |
|---|---|---|---|
| 2,530,924 | 11/1950 | Turner | 297/452.15 |
| 3,222,698 | 12/1965 | Levenson | 297/452.54 |
| 4,307,914 | 12/1981 | Grandclement | 297/452.21 |
| 4,458,943 | 7/1984 | Krakauer | 297/452.21 |
| 4,460,887 | 4/1987 | Fleming et al. | 297/452.54 |
| 4,875,734 | 10/1989 | Yokoyama | 297/452.21 |

FOREIGN PATENT DOCUMENTS

| | | | |
|---|---|---|---|
| 3521067 | 12/1985 | Germany | 297/452.54 |
| 0616038 | 1/1986 | Japan | 297/452.54 |

Primary Examiner—Kenneth J. Dorner
Assistant Examiner—Anthony Barfield
Attorney, Agent, or Firm—Leonard Kalinowski; E. L. Levine; Joseph E. Root, III

[57] ABSTRACT

A sitting section of a vehicle seat which provides comfort for an occupant of the seat and affords protection against the occupant sliding forwards in the event of a crash, the sitting section having a frame with a seat shell having a selected natural vibration and a forward arched section and a section rearward of the arched section which is adapted to oscillate freely and is reinforced with corrugations, the seat shell sloping downwards towards the rear at an angle of about 15°, and the seat shell having relatively thin upholstery fitted thereover.

9 Claims, 4 Drawing Sheets

SITTING SECTION OF A VEHICLE SEAT

BACKGROUND OF THE INVENTION

For vehicle seats it is well known to provide seating parts made up of a lower support part comprising a pressed steel sheet framework provided with various spring fittings, such as elastic webbing or packets of steel springs, as in upholstered seats for chairs or armchairs, on which the seat upholstery is placed.

In a known example of this kind (German Utility Model 77 28 111) a plurality of transverse elastic belts are provided upon which an upholstery body lies, the upholstery body having in the forward region a transverse rail-like support body as a precaution against the user of the seat sliding forward in the event of heavy braking or in case of an accident. This solution is, however, very costly and for this reason has not found acceptance.

Other known proposals of this kind also employ special parts or structures for the individual functions, such as providing padded and resiliently yielding seating and providing security of the person using the seat against slipping from the seat on strong deceleration of the vehicle, but this leads to too great an outlay, excessive weight and complicated and failure-prone constructions.

Thus German Patentschrift No. 39 07 942 discloses an underframe, a thick upholstery seat cushion, a seat frame for this cushion, a multiplicity of helical steel compression springs acting between a frame and the underframe, and a wide, pivotable stirrup with a means for blocking the stirrup.

SUMMARY OF THE INVENTION

The object of the invention set forth in claim 1 is to provide a comfortable, simple and economic automobile seat that has good vibration damping and shifts the regions of natural vibration of the overall seat structure that usually occur, that as a rule coincide with those of the main parts of the human body, and are unpleasant and damaging to health, so that they no longer cumulatively affect the user of the seat, and provides security against the person in the seat slipping forward in response to strong deceleration, for example in a crash situation.

The particular advantages of the invention are that the combined use of the seat shell not only as a support for the upholstery cushion but also as a lower spring element and a crash protection barrier provides for a vehicle seat that is less costly, and hence more economic, that more reliably supports the seat user from sliding forward off the seat a crash situation, that is relatively light, and that has an overall natural frequency lying outside the region of natural frequencies of parts of the human body. A significant reduction in outlay is achieved through the possibility, offered when forming a seat shell in accordance with the invention, of employing an upholstery cushion which is particularly thin in relative terms.

DESCRIPTION OF THE DRAWINGS

Exemplary embodiments of the invention are shown schematically in the drawings, in which.

DESCRIPTION OF THE PREFERRED EMBODIMENTS

Figure 1:
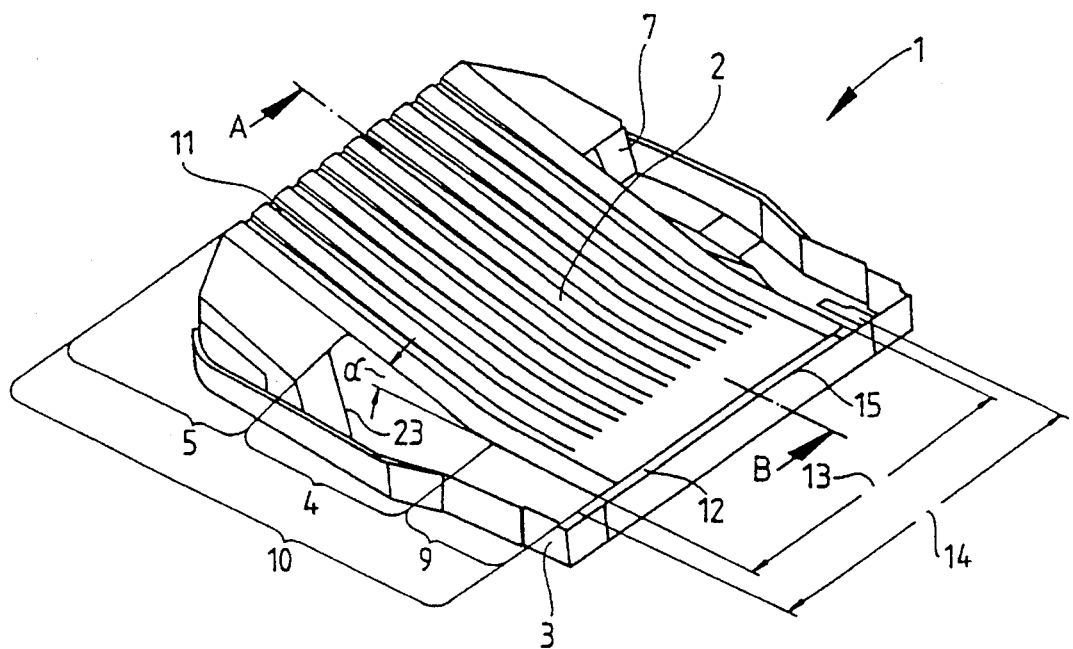
FIG. 1 shows a perspective view of an embodiment of the invention, in which frame and seating area are formed in one piece.

A seat shell 2 with a frame 3 of a base structure 1 of seating part of a vehicle as shown in FIG. 1 is made in piece by non-chip forming from steel sheet by deep drawing, pressing and cutting. In the lower part of the frame 1 connectors (not shown) are provided for mounting and location of the complete seat on the vehicle floor.

In a forward region 5 of the base structure 1, the structure is raised at its forward edge and on each side, with a middle region 4 falling towards the rear at an angle $\alpha$ of about 15°, to reach a short rear region 9. The forward region 5 has a length of about 30% of the overall length 10 of the seat structure 1. From the forward region 5 onwards the shell 2 is formed as a self-supporting support, and the rear region 9, which runs approximately parallel to the floor, lies within the bounds of the height of the frame 3. Over the width of the seat shell 2, adjacent longitudinal channels 11 are pressed, which can be formed parallel in width and height, or with their height decreasing in a selected manner towards the rear, and/or with their width likewise decreasing towards the rear, the tapering preferably being such that the shell provides as far as possible a support of uniform strength and is also favourable from the point of view of the natural frequency of the seat part as a whole, as explained above. Preferably, the channels 11 end short of the back edge 12 of the seat shell 2, so that a suitable space is provided between the channels and the inner back edge 15 of the frame.

These features are determined in accordance with the desired damping and natural frequency of the freely vibrating seat shell 2, having regard to the overall form and fittings of the complete seat, i.e. with its upholstery and covering, to provide very good seating comfort despite low manufacturing outlay for the seat. This also means that the natural frequency of the seat must differ from those of the main parts of the human body. Beneath the forward region 5, which is terminated at the rear by a substantially vertical edge region 7, reinforcing parts or transverse channels may be provided if needed, to support the region. The width 13 of the seat shell 2 is made somewhat smaller than the internal width 14 of the frame 3.

Figure 2:
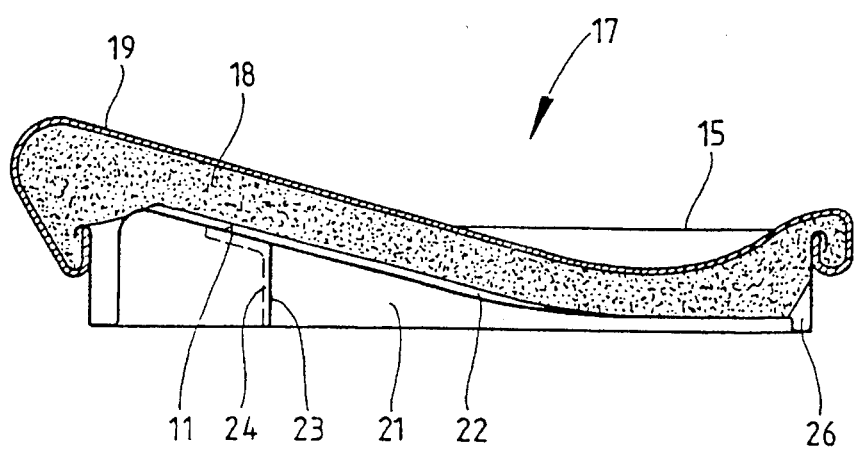
FIG. 2 shows a corresponding cross-section taken along line A–B in FIG. 1, supplemented with complete upholstery.

The sectional view of FIG. 2 shows a complete seating part 17, in which a relatively thin cushion 18, wrapped in a cover 19, is provided on the base structure 21. The base structure 21 is a modification of the base structure 1, in which for instance a seat shell 22, when not loaded, lies deeper in the rear region than a top edge 15 of a frame 26.

The dimensions of the longitudinal channels 11 gradually decrease in the middle region, and in the rear region 9 the channels run out, in each case with a view to the provision of a support of uniform strength. A rim 23 corresponds approximately to the edge region 7 of FIG. 1 A bridge 24 can also be employed in case of need.

Figure 3:
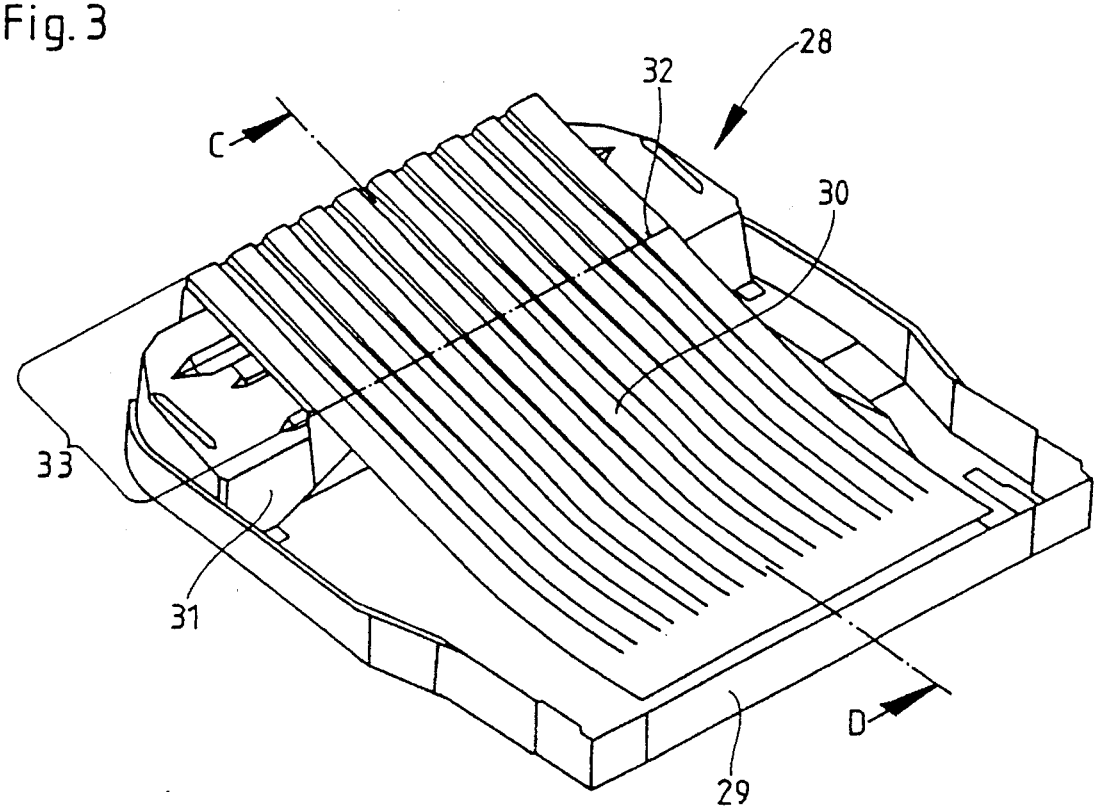
FIG. 3 shows a seat similar to that of FIG. 1, but with n two-piece construction.
Figure 4:
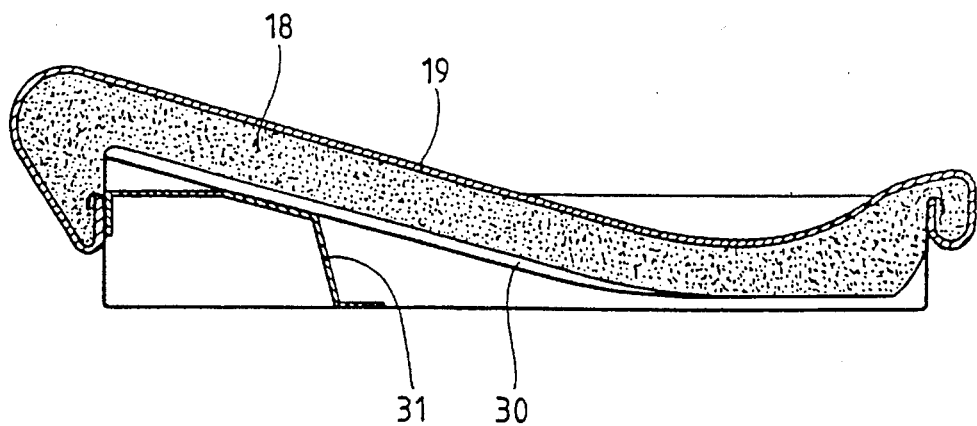
FIG. 4 shows a section taken along line C–D in FIG. 3.

In a base structure 28 as shown in FIG. 3, a frame 29 and a seat shell 30 correspond approximately to similar parts of the base structure 1 of FIG. 1. The seat shell 30 and the frame 29 are, however, manufactured as separate parts, with a forward region 33 of the seat shell 30 affixed to a bridge 31 of the frame 29 by welding, riveting or screw fastening. FIG. 4 shows, in a similar way to FIG. 2, the upholstery 18 with the cover 19 corresponding to those parts in FIG. 2.

In case of overloading, in a so-called crash situation, the seat shells 2 or 30, as the case may be, bend downwardly at the root of their free-swinging part, that is approximately about the line 32, as a result of the high mass loading due to the person sitting on the seat, who is thereby more securely restrained from sliding forwardly from the seat, thus reducing the risk of injury.

The seat shell 30 is connected to the bridge 31. The seat shell 30 may alternatively be made of suitable plastics material or plywood or similar material, which is then appropriately screw fastened to the bridge 31.

Figure 5:
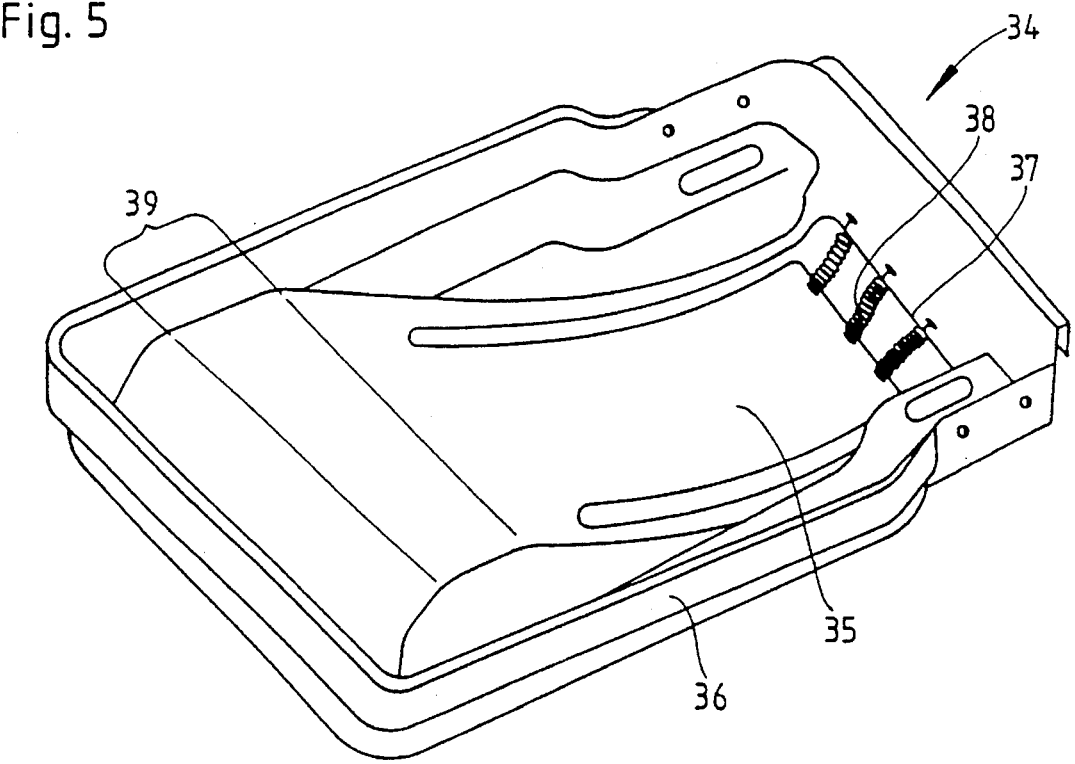
FIG. 5 shows a perspective view of a vehicle seat with the seat shell additionally resiliently mounted at the rear.

The base structure 34 of FIG. 5 is provided with a seat shell 35 which is made in one piece with a frame 36 or is made separately and fixedly located to the frame 36, which shell may be formed similarly to those described above except for being smooth or only lightly channelled, with spring fittings 38 at its rear edge which elastically take up part of the loads applied to the seat shell 35 by a person sitting thereupon. A plurality of helical tension springs are shown, which at their other ends are attached to the frame 36. Any other known spring arrangements can alternatively be used, for example conically wound coil tension or compression springs or hydraulic springs, or similarly effective leaf springs, rubber buffers, air springs and the like. Care must however be taken that the resulting overall natural frequency of the seat system lies outside that of the main parts of the human body, to which end spring arrangements with nonlinear characteristics, such as can for example be provided with conically wound helical springs, are suitable. A forward region 39 runs substantially parallel to the floor which can increase seating comfort, depending on the overall dimensions of the seat part.

Figure 6:
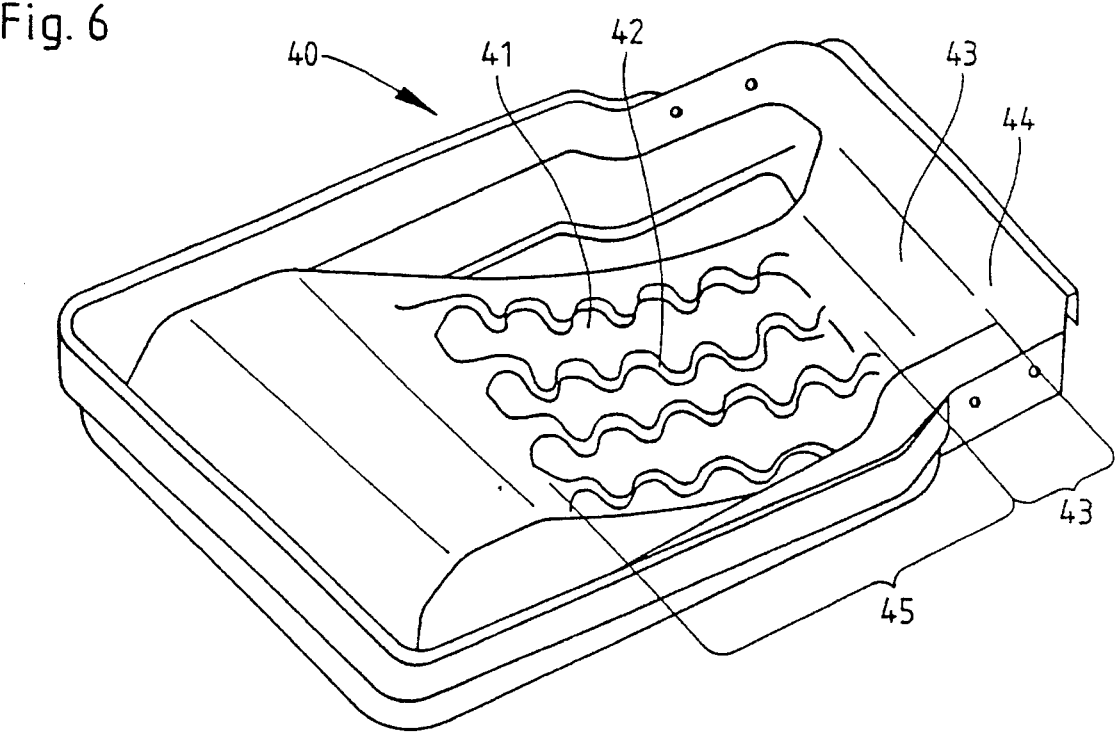
FIG. 6 and FIG. 7 show perspective views of further modified embodiments.

The exemplary embodiment of FIG. 6 has a base structure 40 which, in contrast to the base structure of FIG. 5, has a seat shell 41 with, in its middle region 45, a plurality of adjacent wave-like spring strands 42 formed by stamping out, which run up to the rear region 43, with a remaining section 46 which is not stamped through affixed to the frame 44.

Figure 7:
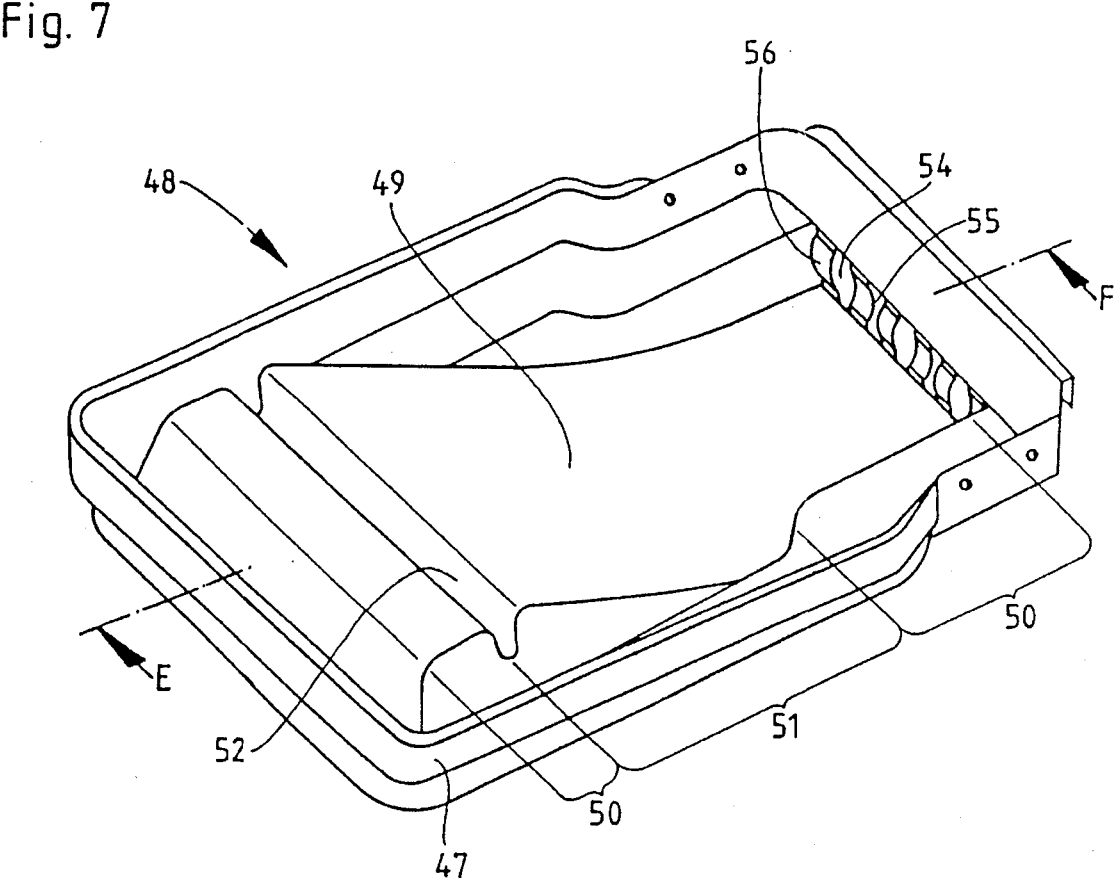
Figure 8:
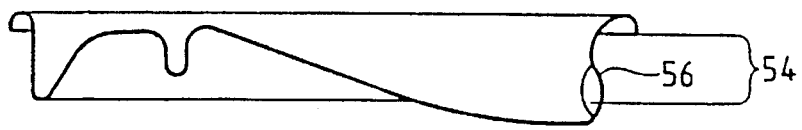
FIG. 8 shows a section taken along line E–F of FIG. 7.

Finally, FIG. 7 shows a further modified form 48 of the base structure, the seat shell 49 of which is provided, in order to improve its spring characteristics, with one or more transverse channels 52 between forward and middle regions 50 and 51; has a bent-up rear region 53, and in this portion 54 is divided across the entire width into a plurality of parts 56 which are alternately forwardly and rearwardly bowed, as clearly shown in FIG. 8.

Figure 9:
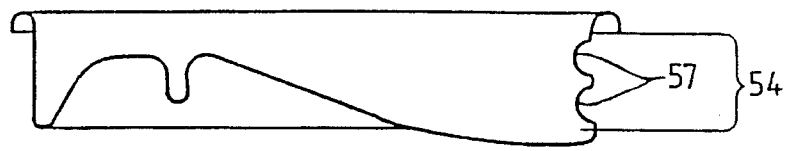
FIG. 9 shows a modification of FIG. 8.

Alternatively, the rising portion 54 may be provided with wave-like transverse channels 57, as shown in FIG. 9.

The invention is not limited to the examples described: in particular, features disclosed in connection with individual exemplary embodiments can be appropriately exchanged one with another.

We claim:

1. A seating section of a vehicle seat comprising: a frame having a rear edge, a thin-walled seat shell arranged thereon, said seat shell having a front edge and a free back edge, and on said seat shell an elastic seat pad of foamed material, rubberised hair or the like, wrapped in a cover material, said seat shell having a forward region, a middle region and a rear region, said thin-walled seat shell being securely fixed to said frame by said forward region and said middle and rear regions being able to flex downwardly relative to said forward region and to said frame with said back edge of said seat shell moving downwardly relative to said rear edge of said frame, at least said middle region extending upwardly forwards at an angle ($\alpha$) of about 15°, and said seat shell having a plurality of parallel, longitudinally extending depressions therein forming channels which extend from said front edge towards said back edge and which terminate forwardly of said back edge of said seat shell and forwardly of said rear edge of said frame.

2. The seating section of a vehicle seat according to claim 1, wherein said seat shell and said frame are produced as an integral structure.

3. The seating section of a vehicle seat according to claim 2, characterized in that said channels taper in width towards the rear of said seat shell.

4. The seating section of a vehicle seat according to claim 1, including a bridge portion fixed to said frame beneath said forward region of said seat shell, said bridge portion supporting said seat shell on said frame.

5. The seating section of a vehicle seat according to claim 1, wherein said middle region and part of said rear region include a plurality of adjacent, cut-out, wave-shaped spring strands, for enabling at least the rear region of the seat shell to flex relative to the frame.

6. The seating section of a vehicle seat according to claim 1, characterized in that said seat shell is made of plastic material, plywood or the like.

7. The seating section of a vehicle seat according to claim 1, characterized in that said seat shell and said frame are made as separate parts.

8. A seating section of a vehicle seat comprising: a frame, having front and rear edges a seat shell arranged on said frame, and a seat cushion on said seat shell, said seat shell being of a thin-walled construction and having a forward region, a middle region and a rear region, with a free back edge said seat shell being securely fixed to said frame solely at said forward region thereof, permitting said middle and rear regions of said seat shell to flex downwardly relative to said forward region and to said frame with said back edge of said seat shell moving downwardly relative to said rear edge of said frame, and at least said middle region of said seat shell extending upwardly in a forward direction at an angle of about 15°.

9. A seating section of a vehicle seat comprising: a frame having a rear edge, a thin-walled seat shell arranged thereon, and on said shell an elastic seat pad of foamed material, rubberised hair or the like, wrapped in a cover material, said seat shell having a forward region, a middle region and a rear region, said thin-walled seat shell being securely fixed to said frame solely by said front region, permitting said middle and rear regions of said seat shell to flex downwardly relative to said forward region and to said frame with said back edge of said seat shell moving relative to said rear edge of said frame, at least said middle region extending upwardly towards at an angle ($\alpha$) of about 15°, and said seat shell being provided with channels that run substantially parallel towards the rear, said channels tapering in depth towards the rear of said seat shell.

* * * * *